July 7, 1925.
M. O. JOHNSON
1,544,990
METHOD AND MEANS OF ENHANCING THE GROWTH OF PLANTS
Filed Sept. 27, 1922
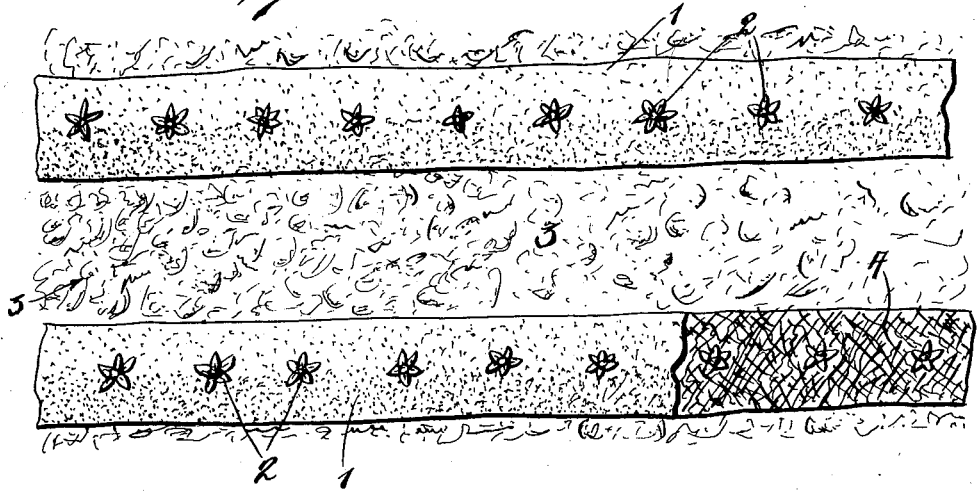
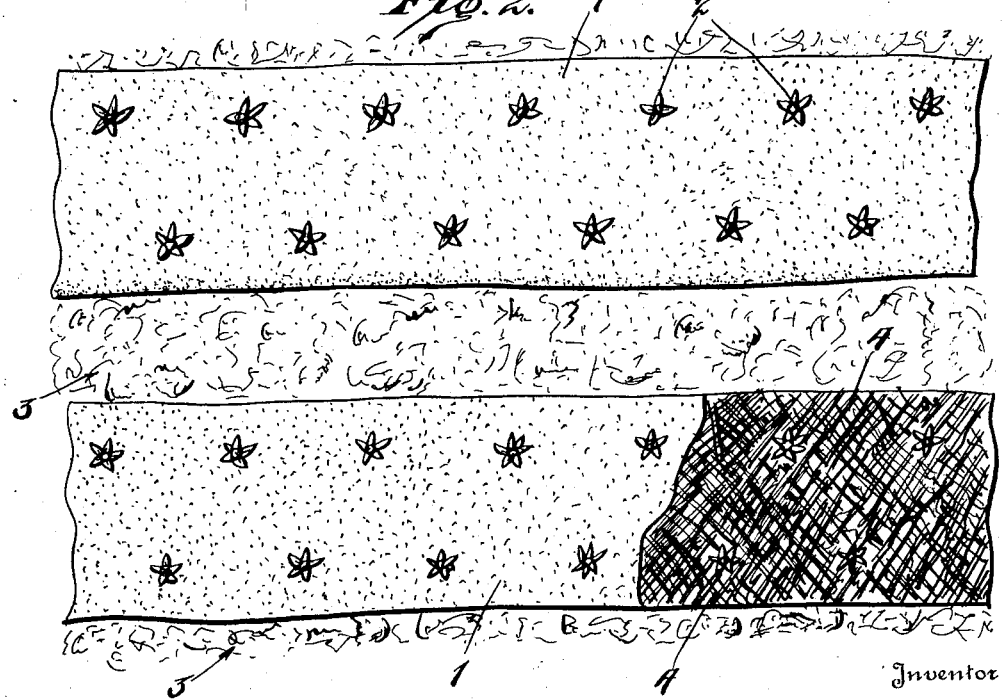
Inventor
Maxwell O. Johnson
By
Attorney

Patented July 7, 1925.

1,544,990

UNITED STATES PATENT OFFICE.

MAXWELL O. JOHNSON, OF WAIPIO, TERRITORY OF HAWAII.

METHOD AND MEANS OF ENHANCING THE GROWTH OF PLANTS.

Application filed September 27, 1922. Serial No. 590,976.

*To all whom it may concern:*

Be it known that I, MAXWELL O. JOHNSON, a citizen of the United States of America, residing at Waipio, in the county of Honolulu and Territory of Hawaii, have invented certain new and useful Improvements in Methods and Means of Enhancing the Growth of Plants, of which the following is a specification.

This invention relates to an improved method of and means for enhancing the growth of plants.

In the ordinary practice of agriculture, the young plants are subjected to a deleterious weed growth, and these weeds must be removed to prevent choking the plants. Ordinarily, if the plants are in rows, the weeds growing between the rows may be easily and cheaply effaced by horse cultivation, but the weeds growing between the plants of the row, and immediately around the plants, must be carefully removed by hand cultivation, which is not only a matter of considerable expense, but ordinarily difficult without considerable damage to the plants. Furthermore, with most cultivated plants, and particularly the pineapple, the natural water supply is not adapted to the maximum growth of the plant. The rain fall is variable and excessive rain fall causes such complete saturation of the soil as is not well adapted for the plant growth. These periods of rain fall are usually followed by periods of drought, during which the moisture of the soil is quickly evaporated and the roots of the plants dried out to a very undesirable extent.

It is the object of the present invention to provide the soil throughout the length of the row of plants and for some little distance on each side of the plants, with a film of material, which on exposure to the atmosphere, becomes sufficiently hard to be rendered impervious to moisture, and of course, impenetrable to plant life. This layer is of course applied around the growing plant to be protected, in such a manner that the soil on both sides of the particular plant and between the adjacent plants of a row are covered with the material provided.

This material on hardening will of course prevent weed growth between or immediately adjacent the plants, and furthermore, will act to conserve the natural moisture of the ground in an obvious manner. The rain fall cannot penetrate this layer and is hence directed from the layer to the ground between the layers of adjacent rows of plants, and thus complete saturation in the immediate vicinity of the plant is avoided. The ground immediately surrounding the plant however, will receive sufficient moisture from the central saturated portion to supply the plant. Furthermore, this layer serves to prevent evaporation of the moisture of the ground between the plants and immediately surrounding each plant, thereby retaining this natural moisture for the growth of the plant.

It is well understood that growing plants suffer from considerable variation in temperature. The radiation of the heat from the soil at night and the consequent cooling of the soil about the plant acts to retard the plant growth. By the method described, this extreme radiation of heat and consequent undesirable cooling of the soil at night is avoided, and the soil about the plant is maintained at the best temperature for the plant growth.

Furthermore, if desired and as preferred, there may be added to the material forming the basis of the present method a black pigment, such as lamp black, whereby to promote absorption of heat from the sun.

The method is illustrated in the accompanying drawings, in which:

Fig. 1 is a view showing the improved layers applied to a single row of plants.

Fig. 2 is a similar view showing the impervious layer applied to a double row of plants.

In carrying out the method, the layer 1, which must be of a material capable of being readily applied by spraying, pouring, or the like, and subsequently hardened on exposure to the atmosphere, is applied in a row corresponding to the row of plants, whether double or single, and covering the soil on each side of the plants and between them, as illustrated. The plants 2, are thus growing in a band or belt of material impervious to moisture and absolutely precluding other plant life throughout the area of this band. The space 3 between the rows of plants is left free, as it may be readily cultivated by horse or other power cultivation to keep down the weeds, and as it is desired to form a sort of reservoir for the accumulation of excess moisture for distribution to the plants beneath the layer 1.

The material contemplated may be any of the well known materials capable of being applied in liquid or semi-liquid form and hardening on the exposure to the atmosphere. For example, Portland cement, with or without the usual associated material, paraffin, tar pitch, asphalt, stucco, plaster of Paris, sodium silicate, or any similar materials may be used, so long as they possess the characteristics of being conveniently applied and hardening under exposure to the atmosphere.

It may be found desirable, and as contemplated within the present method, to provide a porous layer on the immediate surface of the soil beneath the hardened layer 1. For this purpose, a layer of straw, sugar cane, bagasse, or the like, as indicated at 4, may be first applied to the soil and the hardening or protective layer subsequently applied.

The protective layer may of course be applied at any stage in the growth of the plant, though it is preferably applied at the very early stages in such growth. Through its use, the plant is protected against excessive changes in temperature or moisture conditions, and interfering or deleterious weed growth is absolutely prevented.

Claims:

1. The herein described method of enchancing the growth of plants arranged in rows, consisting in applying a film of material in fluid form directly to the soil around and between the plants of the row, said material being of a nature to harden under atmospheric exposure to a degree to be rendered impervious to moisture.

2. The herein described method of enhancing the growth of plants arranged in rows, consisting in applying a film of material in fluid form and containing a quantity of black pigment directly to the soil around and between the plants of the row, said material being of a nature to harden under atmospheric exposure to a degree to be rendered impervious to moisture.

3. The herein described method of enhancing the growth of plants arranged in rows, consisting in applying a film of material in fluid form directly to the soil around and between the plants of the row, said material being of a nature to harden under atmospheric exposure to a degree to be renedered impervious to moisture, the layers of impervious materials of adjacent rows being spaced apart to leave an intervening area of uncovered soil to serve as a moisture reservoir in receiving water deflected from the surface of adjacent layers.

4. The herein described method of enhancing the growth of plants, consisting in spraying a film of material directly onto the soil surface for an appreciable area about the growing plant, the material being of a nature adapted to harden under exposure to the atmosphere to render the same impervious to moisture.

In testimony whereof I affix my signature.

MAXWELL O. JOHNSON. [L. S.]